US 10,122,915 B2

(12) United States Patent
Maayan et al.

(10) Patent No.: US 10,122,915 B2
(45) Date of Patent: Nov. 6, 2018

(54) METHOD AND DEVICE FOR PANORAMIC IMAGE PROCESSING

(71) Applicant: TRAX TECHNOLOGY SOLUTIONS PTE LTD., Singapore (SG)

(72) Inventors: Hilit Maayan, Kfar-Yedidya (IL); Daniel Shimon Cohen, Ra'anana (IL); Jacob Greenshpan, Tzur-Moshe (IL)

(73) Assignee: TRAX TECHNOLOGY SOLUTIONS PTE LTD., Singapore (SG)

( * ) Notice: Subject to any disclaimer, the term of this patent is extended or adjusted under 35 U.S.C. 154(b) by 0 days.

(21) Appl. No.: 15/187,276

(22) Filed: Jun. 20, 2016

(65) Prior Publication Data

US 2016/0309082 A1    Oct. 20, 2016

Related U.S. Application Data

(63) Continuation of application No. 14/151,011, filed on Jan. 9, 2014.

(51) Int. Cl.
| | |
|---|---|
| *G09G 5/00* | (2006.01) |
| *H04N 5/232* | (2006.01) |
| *G06T 3/40* | (2006.01) |
| *G06T 3/20* | (2006.01) |
| *H04N 5/265* | (2006.01) |

(52) U.S. Cl.
CPC ........... *H04N 5/23222* (2013.01); *G06T 3/20* (2013.01); *G06T 3/40* (2013.01); *H04N 5/23238* (2013.01); *H04N 5/265* (2013.01)

(58) Field of Classification Search
CPC ......... G06T 2200/32; G06T 3/20; G06T 3/40; G06T 3/4038; G06K 9/52; H04N 5/23222; H04N 5/23238

USPC ....... 345/619, 620, 621, 625, 629, 630, 634, 345/635, 636, 641, 648, 649, 650
See application file for complete search history.

(56) References Cited

U.S. PATENT DOCUMENTS

| | | |
|---|---|---|
| 6,618,511 B1 | 9/2003 | Mancuso et al. |
| 7,287,731 B2 | 10/2007 | Johnson |
| 7,620,909 B2 | 11/2009 | Park et al. |
| 8,515,207 B2 | 8/2013 | Chau |
| 8,559,766 B2 | 10/2013 | Tilt et al. |

(Continued)

*Primary Examiner* — Xiao Wu
*Assistant Examiner* — Sarah Lhymn
(74) *Attorney, Agent, or Firm* — Finnegan, Henderson, Farabow, Garrett & Dunner LLP

(57) ABSTRACT

The present disclosure provides a method for providing an indication about a distance between a retail unit and an electronic device, comprising: acquiring from an image sensor in a retail establishment, at least one image of a product on a store shelf; accessing in a memory that stores a plurality of templates associated with a plurality of differing products, a template associated with the product on the store shelf in the at least one acquired image; comparing at least one dimension associated with the product in the at least one acquired image with at least one dimension associated with the accessed template; based on the comparison, determining whether a distance between the image sensor and the product on the store shelf is within an acceptable range for additional image processing; and providing a notification to a user of the electronic device to adjust the distance between the image sensor and the product on the shelf when the product is outside of the acceptable range.

20 Claims, 7 Drawing Sheets

(56) References Cited

U.S. PATENT DOCUMENTS

| | | | |
|---|---|---|---|
| 9,160,899 B1 | 10/2015 | Boyle et al. | |
| 2005/0256391 A1 | 11/2005 | Satoh et al. | |
| 2007/0025723 A1 | 2/2007 | Baudisch et al. | |
| 2007/0031062 A1 | 2/2007 | Pal et al. | |
| 2007/0070233 A1 | 3/2007 | Patterson | |
| 2007/0081081 A1 | 4/2007 | Cheng | |
| 2008/0074489 A1 | 3/2008 | Zhang et al. | |
| 2009/0192921 A1* | 7/2009 | Hicks | G06F 3/0312 705/28 |
| 2010/0097443 A1 | 4/2010 | Lablans | |
| 2010/0171826 A1* | 7/2010 | Hamilton | G06Q 30/06 348/135 |
| 2010/0222099 A1 | 9/2010 | Fields | |
| 2010/0321470 A1* | 12/2010 | Oshima | G03B 17/18 348/36 |
| 2011/0011936 A1* | 1/2011 | Morandi | G06K 9/00 235/454 |
| 2011/0079083 A1 | 4/2011 | Yoo et al. | |
| 2012/0027390 A1 | 2/2012 | Ueyama | |
| 2012/0075411 A1* | 3/2012 | Matsumoto | G03B 37/00 348/36 |
| 2012/0293607 A1 | 11/2012 | Bhogal et al. | |
| 2012/0300019 A1 | 11/2012 | Yang et al. | |
| 2012/0323620 A1* | 12/2012 | Hofman | G06Q 10/06 705/7.11 |
| 2013/0051667 A1* | 2/2013 | Deng | G06K 9/00691 382/168 |
| 2013/0173435 A1* | 7/2013 | Cozad, Jr. | G06Q 10/087 705/28 |
| 2014/0052555 A1* | 2/2014 | MacIntosh | G06Q 20/208 705/23 |
| 2015/0139535 A1* | 5/2015 | Siddiqui | G06K 9/00208 382/154 |
| 2015/0141759 A1 | 5/2015 | Charles et al. | |

\* cited by examiner

METHOD AND DEVICE FOR PANORAMIC IMAGE PROCESSING

CROSS REFERENCES TO RELATED APPLICATIONS

This is a continuation application of application Ser. No. 14/151,011 filed Jan. 9, 2014, the entire disclosure of which is incorporated herein by reference.

TECHNOLOGICAL FIELD

The present disclosure relates to the field of digital imaging. More particularly, the present disclosure relates to methods and devices useful in the field of panoramic photography.

BACKGROUND

Conventional panoramic images are generally acquired by pivoting an imaging device at a given location. However, panoramic images can also be acquired by sweeping the imaging device in a given direction. For example, the imaging device can be translated substantially parallel to an object plane and to the ground in order to acquire a panoramic scene. In the latter panoramic scenario, specific challenges are encountered related to maintaining the 6 degrees of freedom of the imaging device in accordance with an expected trajectory. Furthermore, additional constraints arise when using panoramic photography in a retail store environment to scan a retail unit.

GENERAL DESCRIPTION

The present disclosure provides a method useful in panoramic photography which notably facilitates the positioning of the imaging device by a user.

In the present application, the following terms and their derivatives may be understood in light of the below explanations.

The terms "scanning" or "sweeping" may refer to translating an imaging device along a scanning direction while acquiring images with the imaging device. A frame rate of acquisition suitable for the present disclosure may be of around 2 frames per second. It is noted that the scanning may comprise several stages and may contain one or more horizontal and/or vertical stages.

The term "stream of images" may refer to an ordered set of images i.e. to a sequence of images. The term "image prior to a given image" in the context of a stream of images may be understood—unless mentioned otherwise—as referring to the image directly prior to the given image in the stream. It is further noted that the stream of images may be directly provided by an image sensor or may alternatively be pre-processed so as to result from a selection and/or a filtering of images in the series of images acquired by the image sensor.

The term "real time" may be used herein to refer to substantially simultaneous operations. In the present disclosure, upon acquiring by an image sensor and receiving of (data representative of) the image by the processor, a panoramic image is concurrently calculated and displayed in a preview window.

The term "overlapping images" may be understood as referring to images which at least present a partial overlap i.e. at least a part of one of the overlapping image is found in the other overlapping image.

The term "scaling factor" may refer to a ratio between a width of a floating panoramic image as displayed in the preview window and a width of a floating panoramic image as computed. For example, if the computed a floating panoramic image has a width of 1000 pixels and is displayed in a cell of the preview window of 150 pixels, the scaling factor may be of 15%.

The term "inner slice" may be used herein to refer to a slice of an image taken within (inside) the image i.e. an inner portion/cut of an image along a thickness of the image. The term "outer slice" (or "peripheral slice") may be used in contrast to refer to a slice of an image along the thickness of the image which extends until an end of the image i.e. the outer slice reach three edges of the image.

Therefore, the present disclosure provides an image processing method comprising: receiving a stream of overlapping images; obtaining a corresponding stream of floating panoramic images by computing in real time, for each received overlapping image, an associated floating panoramic image using said overlapping image and a floating panoramic image associated with an overlapping image received prior to said overlapping image; displaying in real time with a predetermined scaling factor the stream of floating panoramic images in a preview window of a display unit, wherein the displaying comprises shifting the floating panoramic images relative to the preview window when the floating panoramic images scaled according to the predetermined scaling factor extend beyond the preview window so that at least a working portion of the overlapping image associated with the floating panoramic image being displayed is visible in the preview window.

In some embodiments, an initial floating panoramic image is derived from a first image of the stream of overlapping images.

In some embodiments, an amplitude of the shifting further enables to leave a blank area of a predetermined size in the preview window thereby enabling displaying at least one subsequent floating panoramic image using the same shifting amplitude.

In some embodiments, the stream of overlapping images is acquired by moving an imaging sensor along a predetermined direction.

In some embodiments, the received stream of overlapping images result from a selection of acquired overlapping images acquired by moving an imaging sensor along a predetermined direction.

In some embodiments, the computing comprises cropping a margin around the received overlapping images.

In some embodiments, obtaining an initial floating panoramic image comprises downsampling the first image of the stream of overlapping images and the real time computing of the floating panoramic image associated with each overlapping image comprises stitching a downsampled version of said overlapping image and the floating panoramic image associated with an overlapping image received prior to said overlapping image.

In some embodiments, the stitching is performed by appending an inner slice of the overlapping image at an edge of the floating panoramic image associated with the overlapping image received prior to said overlapping image.

In some embodiments, the stitching is performed by superimposing an outer slice of the overlapping image at an inner stitching portion of the floating panoramic image associated with the overlapping image received prior to said overlapping image.

In some embodiments, the displaying of a floating panoramic image associated with a given overlapping image comprises: revealing instantaneously an overlying portion of the floating panoramic image, wherein the overlying portion is analogous to a corresponding portion of a floating panoramic image associated with an overlapping image received prior to said given overlapping image; and revealing progressively an additional portion of the floating panoramic image.

In some embodiments, the method further comprises displaying in real time the overlapping image associated with the floating panoramic image.

In some embodiments, the method further comprises displaying a speed indicator indicative of a speed of an imaging sensor providing the stream of overlapping images.

In some embodiments, the method further comprises displaying a distance indicator indicative of a distance from an imaging sensor providing the stream of overlapping images to a forefront of a scene imaged by the imaging sensor.

In some embodiments, the method further comprises displaying a scan direction indicator indicative of a predetermined scan direction.

In some embodiments, the method further comprises displaying in the preview window a target indicator indicative of an expected display of a subsequent floating panoramic image.

In some embodiments, the method further comprises displaying a drift indicator indicative of a drift between an actual trajectory of an imaging sensor providing the stream of overlapping images and an expected trajectory of said imaging sensor.

In some embodiments, the method further comprises displaying assisting lines bounding a position of the drift indicator so as to facilitate a visual assessment of the drift.

In some embodiments, the preview window is superimposed on the display of the overlapping image.

In some embodiments, the preview window has predetermined dimensions.

In some embodiments, the preview window is divided into one or more rows of cells.

In another aspect, the present disclosure provides a method of scanning a retail unit comprising: moving an imaging sensor along a predetermined direction while acquiring a stream of overlapping images of the retail unit; for each acquired overlapping image, computing in real time a floating panoramic image associated with said overlapping image using said overlapping image and a floating panoramic image associated with an overlapping image acquired prior to said overlapping image, wherein an initial floating panoramic image is derived from a first image of the stream of overlapping images, thereby obtaining a stream of floating panoramic images; displaying in real time with a predetermined scaling factor the stream of floating panoramic images in a preview window of a display unit, wherein the displaying comprises shifting the floating panoramic images relative to the preview window when the floating panoramic images scaled according to the predetermined scaling factor extend beyond the preview window so that at least a working portion of the overlapping image associated with the floating panoramic image being displayed is visible in the preview window.

In some embodiments, the overlapping images are received from an image sensor of a handheld electronic device, the computing is run on a processing unit of the handheld electronic device and the display unit is comprised in said handheld electronic device.

In another aspect, the present disclosure provides a computer program product implemented on a non-transitory computer usable medium having computer readable program code embodied therein to cause the computer to perform an image processing method comprising: receiving a stream of overlapping images; obtaining a corresponding stream of floating panoramic images by computing in real time, for each received overlapping image, an associated floating panoramic image using said overlapping image and a floating panoramic image associated with an overlapping image received prior to said overlapping image; displaying in real time with a predetermined scaling factor the stream of floating panoramic images in a preview window of a display unit, wherein the displaying comprises shifting the floating panoramic images relative to the preview window when the floating panoramic images scaled according to the predetermined scaling factor extend beyond the preview window so that at least a working portion of the overlapping image associated with the floating panoramic image being displayed is visible in the preview window.

In another aspect, the present disclosure provides A handheld electronic device comprising: memory; an image sensor; a display communicatively coupled to the memory; and a processing unit communicatively coupled to the memory, display and image sensor, wherein the memory includes instructions for causing the processing unit to perform an image processing method comprising: receiving a stream of overlapping images; obtaining a corresponding stream of floating panoramic images by computing in real time, for each received overlapping image, an associated floating panoramic image using said overlapping image and a floating panoramic image associated with an overlapping image received prior to said overlapping image; displaying in real time with a predetermined scaling factor the stream of floating panoramic images in a preview window of the display, wherein the displaying comprises shifting the floating panoramic images relative to the preview window when the floating panoramic images scaled according to the predetermined scaling factor extend beyond the preview window so that at least a working portion of the overlapping image associated with the floating panoramic image being displayed is visible in the preview window.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 7A illustrates a preliminary step prior to a scanning step according to some embodiments of the present disclosure. FIG. 7B illustrates an attitude indicator according to some embodiments of the present disclosure. FIG. 7C illustrates a speed indicator according to some embodiments of the present disclosure. FIG. 7D illustrates a target indicator and a scanning indicator in a preview window according to embodiments of the present disclosure. FIG. 7E illustrates a drift indicator in the preview window according to some embodiments of the present disclosure.

DETAILED DESCRIPTION OF EMBODIMENTS

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "generating", "determining", "providing", "receiving", "using", "computing", "transmitting", "performing", or the like, may refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

Figure 1:
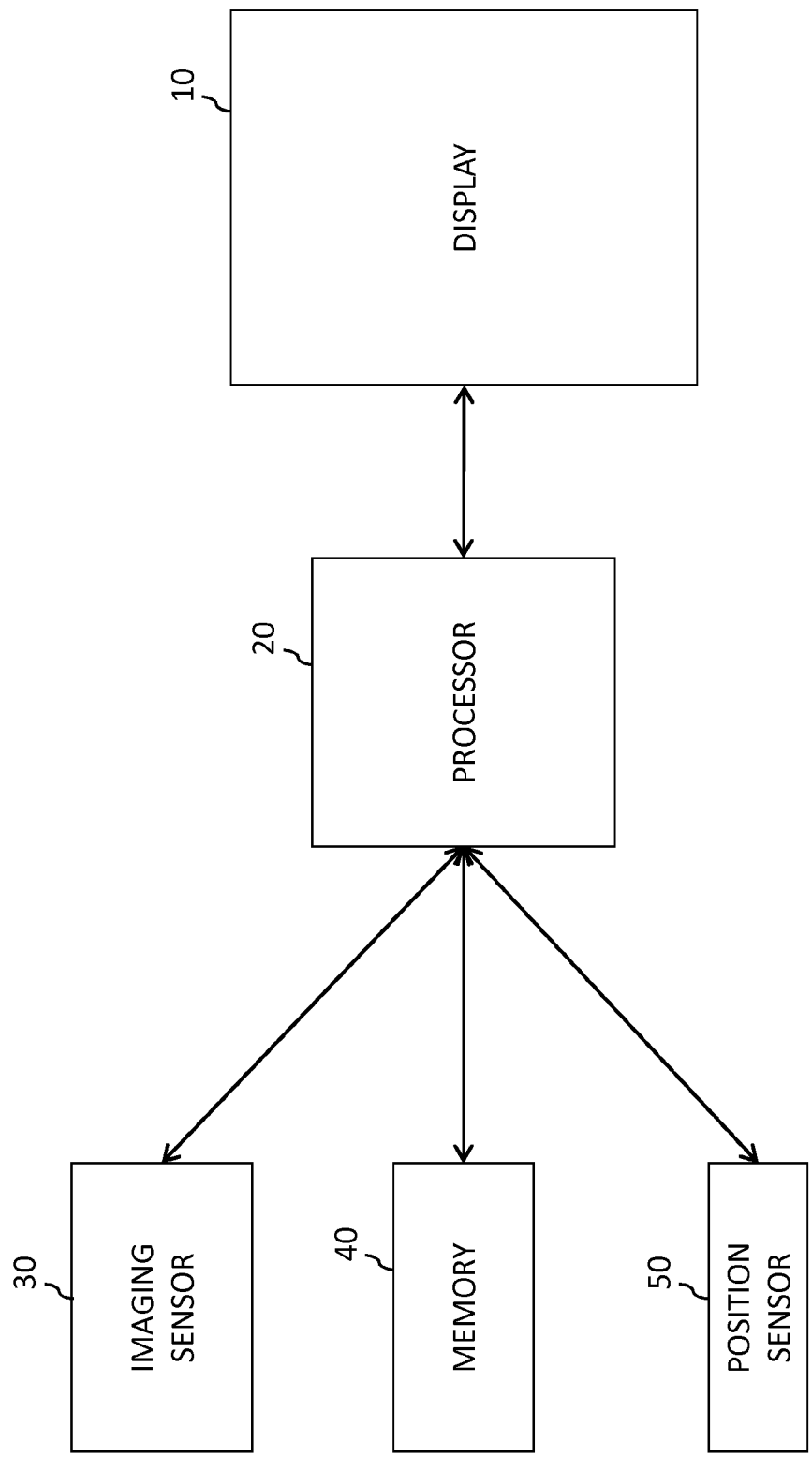
FIG. 1 is a block diagram illustrating schematically an electronic device according to embodiments of the present disclosure.

FIG. 1 illustrates a simplified functional block diagram of an electronic device according to embodiments of the present disclosure. The electronic device may include a display 10, a processor 20, an imaging sensor 30, memory 40 and a position sensor 50. The processor 20 may be any suitable programmable control device and may control the operation of many functions, such as the generation and or processing of image as well as other functions performed by the electronic device. The processor 20 may drive the display (display screen) 10 and may receive user inputs from a user interface. The display screen 10 may be a touch screen capable of receiving user inputs. The memory 40 may store software for implementing various functions of the electronic device including software for implementing the image processing method according to the present disclosure. The memory 40 may also store media such as images and video files. The memory 40 may include one or more storage medium tangibly recording image data and program instructions, including for example a hard-drive, permanent memory and semi permanent memory or cache memory. Program instructions may comprise a software implementation encoded in any desired language. The imaging sensor 30 may be a camera with a predetermined field of view. The camera may either be used in a video mode in which a stream of images is acquired upon command of the user or in a photographic mode in which a single image is acquired upon command of the user. The position sensor 50 may facilitate panorama processing. The position sensor 50 may include a gyroscope enabling calculation of a rotational change of the electronic device from image to image. The position sensor 50 may also be able to determine an acceleration and/or a speed of the electronic device according to three linear axes.

Figure 2:
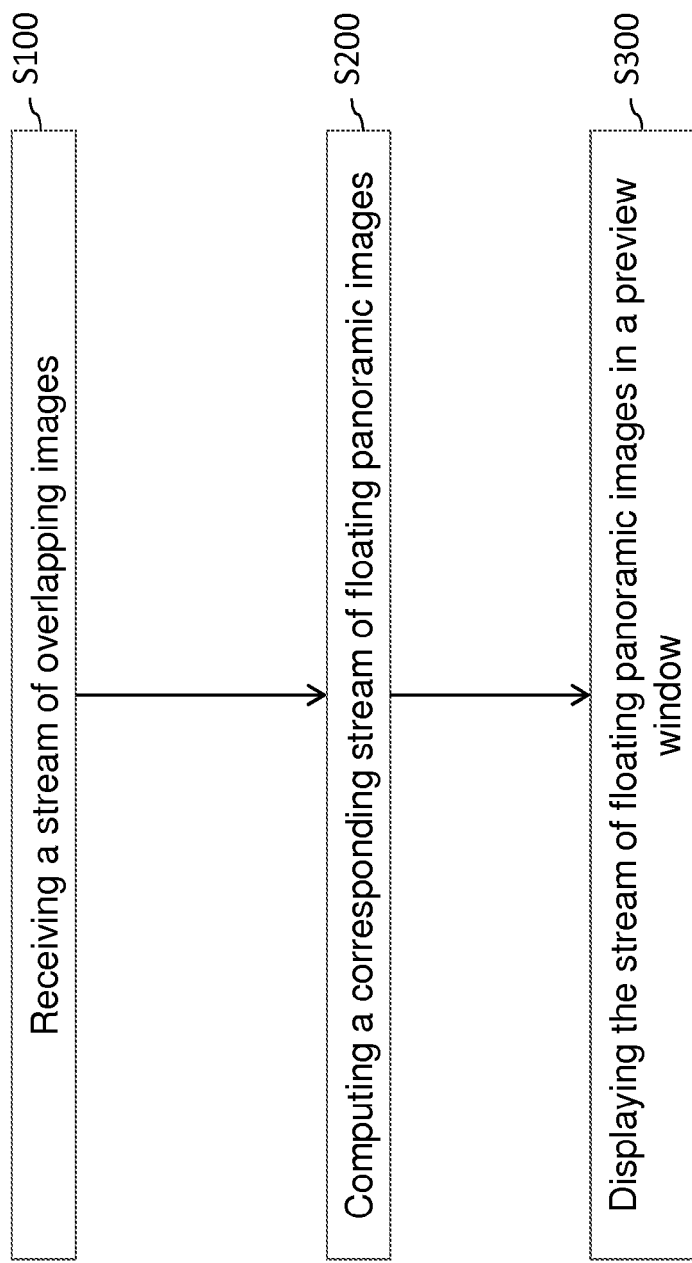
FIG. 2 is a flow chart illustrating steps of a method of image processing according to embodiments of the present disclosure.

FIG. 2 illustrates generally steps of a method of image processing according to embodiments of the present disclosure. The method may be implemented by a processor of a handheld electronic device as previously described. In a first step S100, a stream of overlapping images may be received. The stream of overlapping images may stem from the scanning of an object plane using the camera of the electronic device previously described. The camera may be swept along a scanning axis parallel to a horizontal plane (ground) and to the object plane. The object plane may be a forefront of a retail unit (shelving unit) presenting retail items. The user may adjust the camera to be perpendicular to the floor, for example with the assistance of the attitude indicator described hereinafter, and parallel to shelves of the retail unit, for example with assistance of horizontal lines displayed. In some embodiments, the stream of overlapping images may be displayed in real time on a display screen of the handheld electronic device to form a live video.

Figure 3:
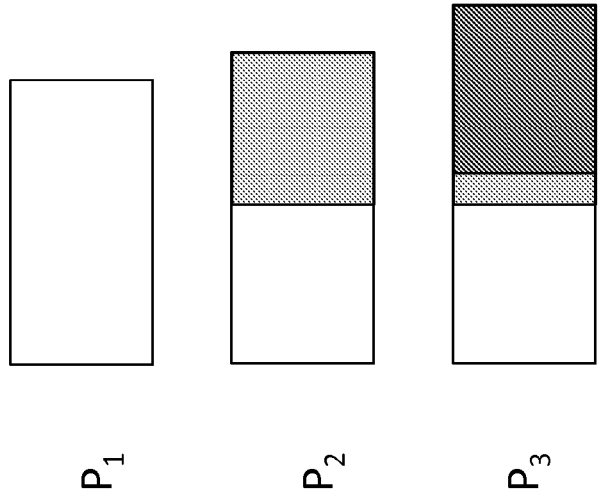
FIG. 3 is a diagram illustrating a step of computing floating panoramic images according to some embodiments of the present disclosure.
Figure 3:
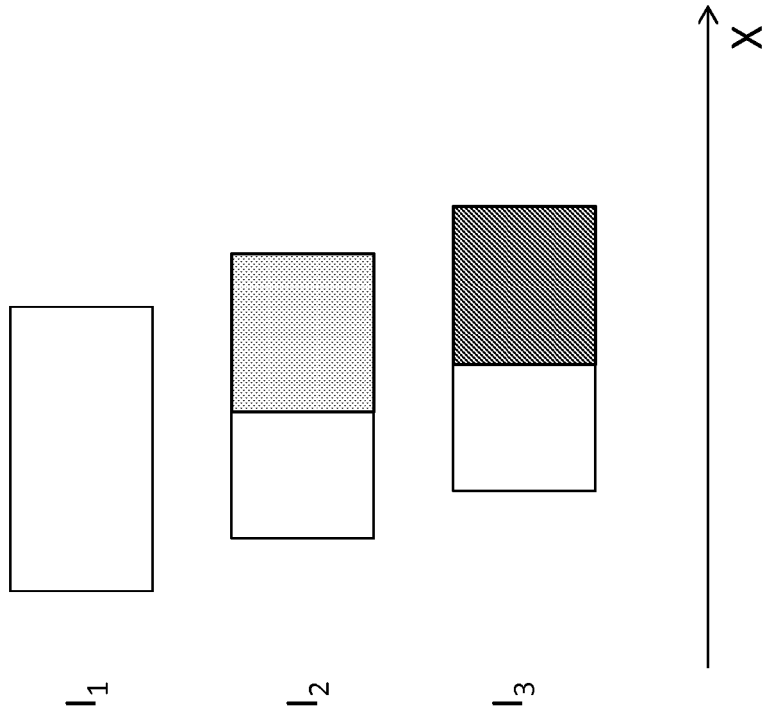

In a second step S200, a stream of floating panoramic images (stitched images) corresponding to the stream of overlapping images may be computed in real time upon receiving of said overlapping images. The floating panoramic images may be computed recursively. An initial floating panoramic image may be derived from a first image of the stream of overlapping images. In some embodiments, the initial floating panoramic image may be a downsampled version of the first image. In some embodiments, the initial floating panoramic may be a downsampled cropped version of the first image. The cropping of the first image may be performed to crop out the outer border (margins) of the first image. For example, 1 to 5% of the filed of view captured by the first image may be cropped out of the first image. For example, 2%, 3% or 4% may be acceptable values. It is noted that the cropping may be further performed on each overlapping images. In particular, cropping the overlapping images may enable avoiding that small misalignments during the scanning cause black areas (without information) on the floating panoramic images. The floating panoramic images corresponding to a given subsequent overlapping image may be computed by stitching a downsampled (and optionally cropped) version of the given overlapping image with the floating panoramic image computed for the overlapping image directly prior to the given overlapping image. The computing may also involve image registration techniques in order to assess a transformation between subsequent overlapping images. In some embodiments, the transformation may be computed on downsampled (and optionally cropped) versions of subsequent overlapping images). In some embodiments, the transformation may be computed on specific portions of the subsequent downsampled (and optionally cropped) versions of subsequent overlapping images. The registration techniques used are classical in the field of panorama processing and are therefore not described herein for the sake of conciseness. In some embodiments, the stitching may be performed between an inner slice of a downsampled (and optionally cropped) version of the given overlapping image and an edge of the floating panoramic image associated with the overlapping image received prior to said given overlapping image. In other words, a specific inner slice of a downsampled (and optionally cropped) version of a subsequent overlapping image is appended at an edge of the floating panoramic image computed at a prior iteration. This slice by slice stitching enables avoiding backward updating of the floating panoramic images. In an alternative embodiment illustrated in FIG. 3, the stitching may be performed by superimposing an outer (peripheral) slice of a downsampled (and optionally cropped) version of the given overlapping image on the floating panoramic image associated with the overlapping image received prior to said given overlapping image. The superimposing may be performed at an inner stitching portion of the floating panoramic image associated with the overlapping image received prior to said given overlapping image. Said inner stitching portion may belong to the overlapping image received prior to said overlapping image. In some embodiments, the inner stitching portion may be representative of a central portion of the overlapping image received prior to said overlapping image. FIG. 3 represents three downsampled versions of overlapping images $I_1$-$I_3$ acquired by scanning a camera along a predetermined axis X and the corresponding panoramic images $P_1$-$P_3$ computed according to the second alternative. As can be seen, the stitching is performed by superimposing an outer (peripheral) slice of the subsequent overlapping image on the prior floating panoramic image, wherein the outer slice is stitched at an inner portion of the prior floating panoramic image. The Applicant has surprisingly noticed that this stitching option, which incurs backward updating of the stitched image and was therefore not intuitively previously developed, when displayed to the user, enables the user to improve the positioning of the handheld electronic device thereby enabling him to perform the scanning more efficiently. In particular, this stitching option provides the possibility of displaying completely the first frame and, when the user reaches the end of the first shelf, an edge of the frame can fit the edge of the preview window. Furthermore, this stitching option enable time saving for the user and the Applicant has found that it is also more intuitive because the stitched image progresses according to what the user faces and sees on the screen.

Figure 4:
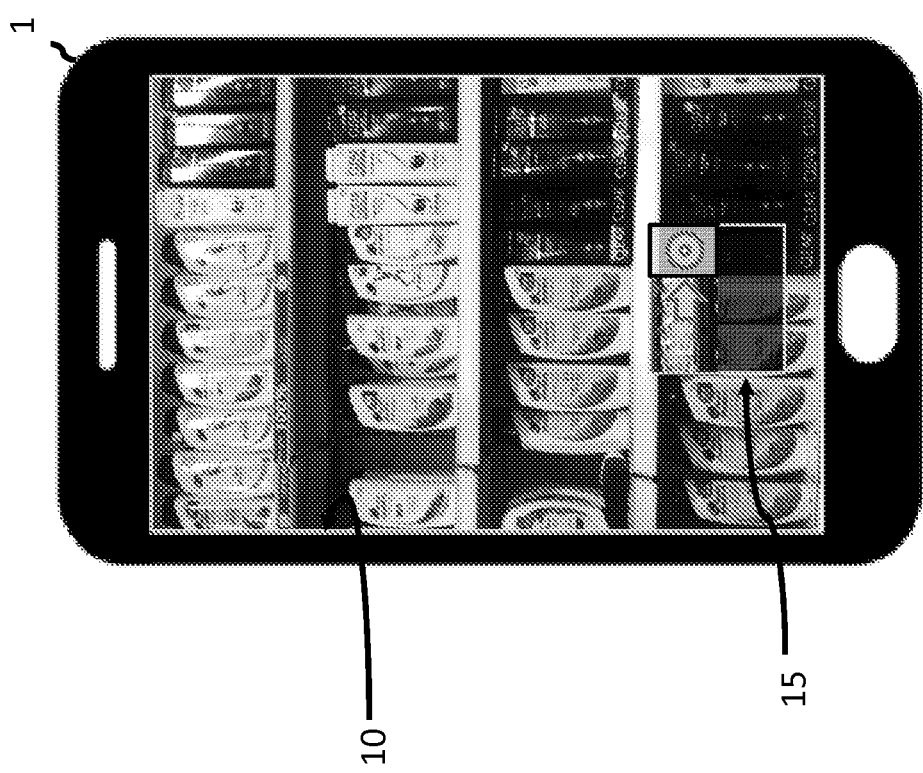
FIG. 4 illustrates a display screen of the electronic device displaying an image and a floating panoramic image associated to said image in a preview window.

In a third step S300, the stream of floating panoramic images may be displayed in real time with a predetermined (constant) scaling factor. As illustrated in FIG. 4, the displaying may be performed in a preview window 15 of a display screen 10 of a handheld electronic device as previously described. The preview window 15 may have predetermined maximum dimensions. In some embodiments, the preview window may be divided into a plurality of cells distributed according to one or more rows. The width of the cells may be predetermined. The height of the cells of a first row of cells may be determined so that one cell contains a single frame (image) with the same aspect ratio as the acquired/received overlapping images. In some embodiments in which the margins (borders) are cropped, the height of the cells of the first row may be determined so that one cell contains a single frame with the same aspect ratio as the acquired/received overlapping images after margins crop. The preview window 15 may be centered with respect to the display screen 10 and may be positioned proximate to the bottom of the display screen 10. In some embodiments, the preview window 15 may be a rectangle placed on top of the live video. Indeed, as shown on FIG. 4, the last received/acquired overlapping image of the stream may be displayed in real time on the display screen to form the live video. The preview window 15 may provide blank areas when the floating panorama does not extend beyond its dimensions and the blank areas may be semi-transparent. In contrast, display of the floating panoramic image in the preview window may be carried out in an opaque manner. In some embodiments, when the floating panoramic image reaches an extremity of a cell, a following cell may be highlighted. The subsequent floating panoramic images may then progress into the highlighted cell.

The Applicant has found that a user may be particularly confused when performing scanning of long amplitude at short distance of objects which resemble each other. Therefore, the Applicant provides hereby a displaying which maintains a scaling factor of the floating panoramic image into a preview window and also provides a shifting function of the floating panoramic image when the floating panoramic image extends beyond the dimensions of the preview window. Thus, the displaying comprises shifting the floating panoramic images relative to the preview window when the floating panoramic images scaled according to the predetermined scaling factor extend beyond the preview window so that at least a working portion of the overlapping image associated with the floating panoramic image being displayed is visible in the preview window. The working portion may comprise a central portion of the overlapping image associated with the floating panoramic image being displayed and/or a fronto-parallel portion of the overlapping image associated with the displayed floating panoramic image. The fronto-parallel portion may be a portion of the overlapping image representative of a region of the object plane extending slightly around a line perpendicular to the object plane and passing by the camera when the camera acquires said overlapping image. In some embodiments, the fronto-parallel region extends of around ±5 degrees around the perpendicular line. In some embodiments, an amplitude of the shifting may be constant, for example a cell size. In some embodiments, the shifting may provide a blank area of a predetermined size in the preview window thereby enabling displaying at least one subsequent floating panoramic image using the same shifting amplitude i.e. so that the working portion for the subsequent floating panoramic image be visible without modifying the shifting amplitude. In other words, the floating panoramic image may be shifted sufficiently for being able to display one or more subsequent floating panoramic image without modifying the shifting amplitude. The shifting enables to make a possibly concealed specific portion of the floating panoramic image visible on the display screen and with a resolution that enables the user to apprehend it. The Applicant has found that displaying the working portion is of particular importance for enabling the user to position the camera for appropriately performing long amplitude scanning at short distance of objects which resemble each other. In some embodiments, the shifting may be implemented smoothly so as to improve user comfort.

Figure 5:
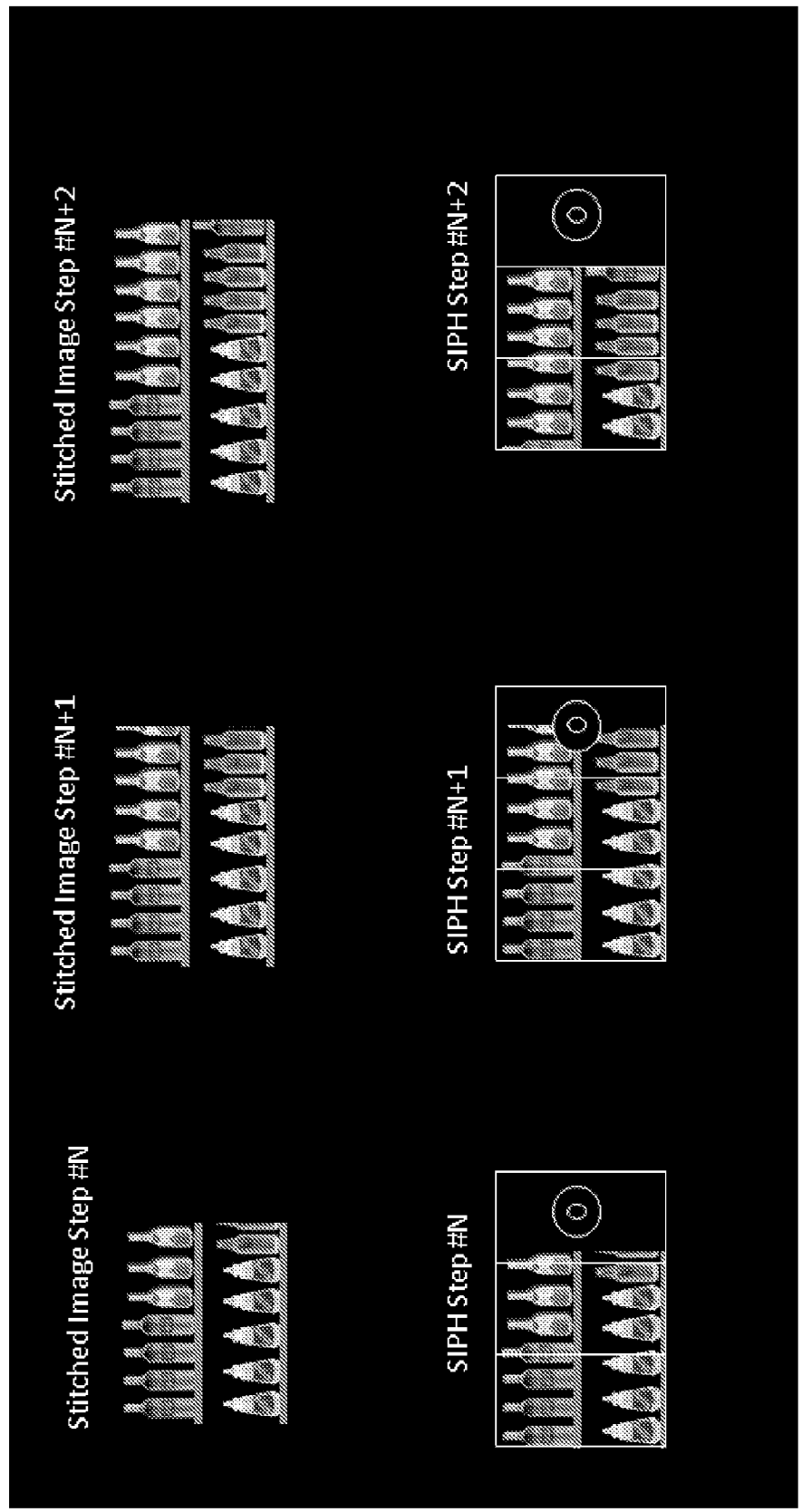
FIG. 5 illustrates a display implementing a shifting function in some embodiments of the present disclosure.

For example, as illustrated on FIG. 5, in a left-to-right scan with a preview window consisting of three cells, once the floating panoramic image reaches an end of the last cell (see stitched image step #N+2), the floating panoramic image is shifted by one cell to the left i.e.:

The floating panoramic image information that appeared in the first cell (extreme left) disappears;

The floating panoramic image information that appeared in the second cell now appears in the first cell;

The floating panoramic image information that appeared in the third cell (extreme right) now appears in the second cell The third cell is emptied.

In some embodiments, when the scanning according to a first direction ends, the present disclosure may comprise another type of shifting of the floating panoramic image for fitting the extremity of the preview window with the extremity of the floating panoramic image corresponding to the end of the scanning according to said first direction. The user may actuate a dedicated icon to mark the end of the scanning (end of a shelf). Images resulting from a scanning according to another direction (vertical) may further be acquired and stitched to the floating panoramic images previously computed. The resulting floating panoramic images may be displayed in the preview window. For example the resulting floating panoramic images may also fill a second row of cells of the preview window.

In some embodiments, an undo function may be available to the user upon command, for example by pressing an undo icon item on the display screen. The undo function may enable the user to cancel the last stitching which occurred. The undo function may also enable the user to cancel a predetermined amount of stitching which previously occurred. The undo function may for example be advantageous in cases of obstruction of the camera by any unwanted objects. When undo operation is performed, another type of shifting may occur to optimize the occupancy of the preview window. This enables to reallocate the preview window to a portion of the floating panoramic image which had been expelled from the preview window.

Figure 6:
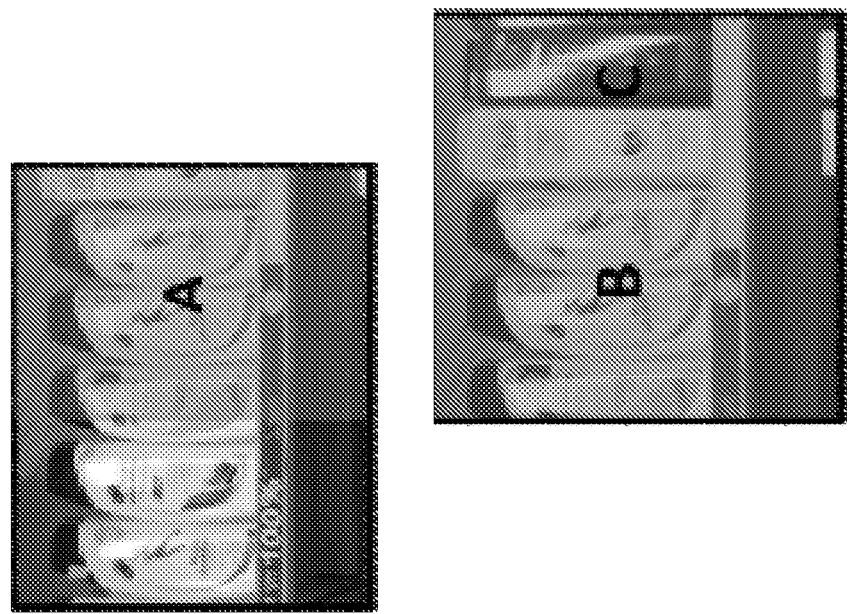
FIG. 6 illustrates a step of displaying a floating panoramic image according to embodiments of the present disclosure.

Furthermore, as illustrated on FIG. 6, the displaying of a floating panoramic image associated with a given overlapping image may comprises revealing instantaneously an overlying portion B of the floating panoramic image, wherein the overlying portion is analogous to a corresponding portion A of a floating panoramic image associated with an overlapping image received prior to said given overlapping image. Further, the displaying of the floating panoramic image may comprise revealing progressively an additional portion C of the floating panoramic image. A rate for progressively revealing the additional portion C may be proportional to the scanning speed.

Figure 7B:
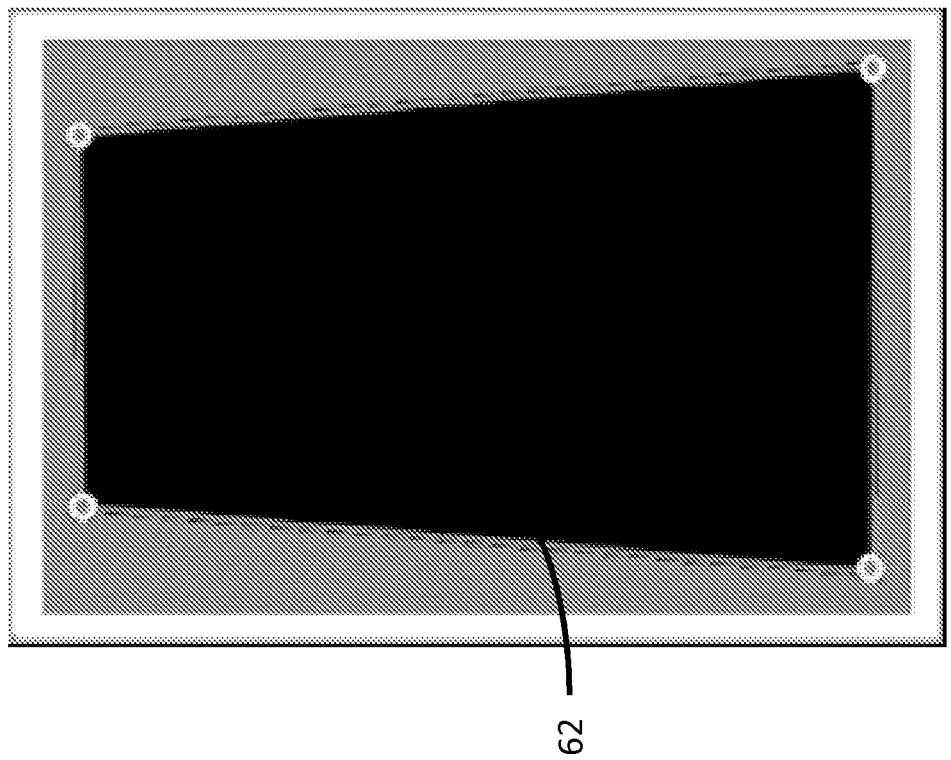
FIGS. 7A-7E illustrate advantageous features of a method according to the present disclosure.
Figure 7A:
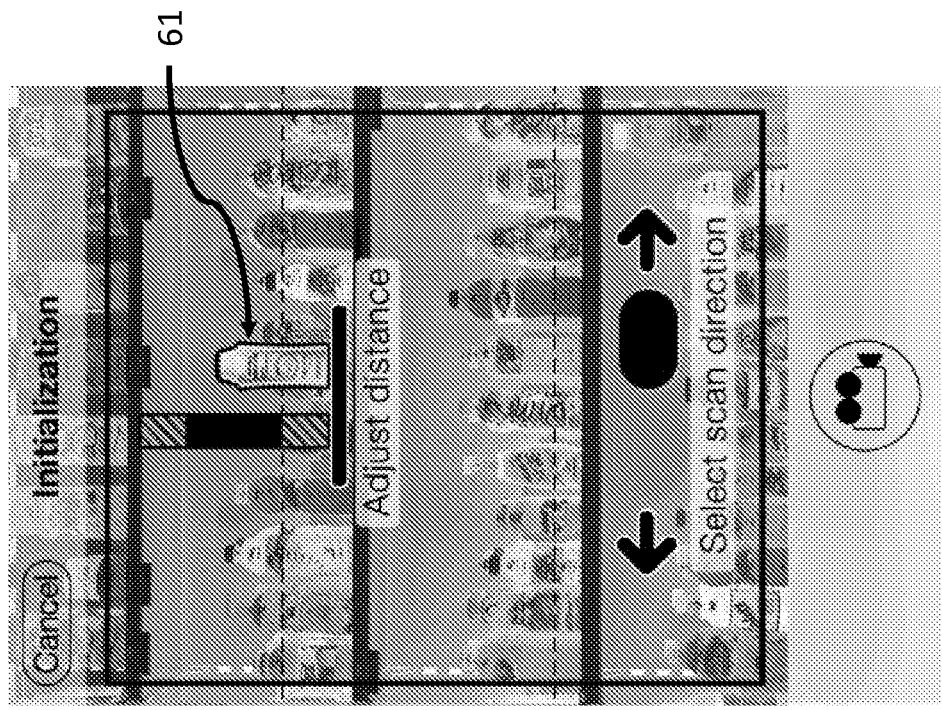

Furthermore, the present disclosure may also comprise monitoring and displaying in real time an indication related to a distance from the electronic device (camera) to the object plane. The distance may be derived from the position sensor of the electronic device and/or using image processing. A distance indicator may be displayed to warn the user that the distance is within and/or out of an acceptable range. In some embodiments, as shown in FIG. 7A, a preliminary step including distance calibration may be performed prior to scanning of the retail unit. For example, when imaging a known retail item (or at least an item from a category with known proportions), the distance to the object plane may be calibrated by matching the imaged retail item with a template image 61 of said retail item stored in the memory of the electronic device and displayed during the preliminary step together with an image preview of the retail unit. When the dimensions of the retail item in the template image coincide with the dimensions of the imaged retail item, the distance to the object plane may be considered as satisfactory. The template image 61 may only be a representation of the silhouette of the retail item. In some embodiments, when the retail item or retail item category is unknown, a generic template may be used. The Applicant has found that in order to optimize the scanning, a product should approximately occupy 30% of the field of view of the imaging sensor (±5% or 10%). Further, modification of the distance to the object plane may be monitored by using the position sensor and/or image processing and displaying of the distance indicator may be performed in real time. For example, the distance indicator may be superimposed on the overlapping image display. Further, as illustrated, the preliminary step may also include a definition of a scanning direction by using a specific icon of a user interface (i.e. left-to-right or right-to-left with respect to the user holding the camera).

Further, the present disclosure may also comprise monitoring in real time an attitude of the camera with respect to a reference attitude. The attitude may be monitored using the position sensor of the electronic device and/or by using image processing. The reference attitude may be an attitude of the camera when acquiring a first image of the stream of images. The rotational change with respect to the reference attitude may be monitored in order to keep the camera facing the object plane. An attitude indicator may be displayed in real time to warn the user that the camera's attitude is out of an acceptable range. For example, the attitude indicator may be superimposed on the overlapping image display. In some embodiments, instead of displaying the Euler angles as a series of digits, the attitude indicator may be displayed as a geometrical shape distorted in accordance with the rotational change between a current attitude and the reference attitude. In some embodiments illustrated on FIG. 7B, the geometrical shape may be a rectangle 62 enveloping a periphery of the display screen. The distortion of the rectangle may be a rotation according to the measured rotational change followed by a projection. When the rotational change is out of an acceptable range, the rectangle may be displayed with a predetermined color different to that shown when the rotational change is acceptable so as to attract the user's attention.

Furthermore, the present disclosure may also comprise monitoring a scanning speed of the camera using the position sensor of the electronic device and/or image processing to assess motion blur. As shown on FIG. 7C, a speed indicator 63 may be displayed in real time to warn the user that the scanning speed is within and/or out of an acceptable range.

Figure 7D:
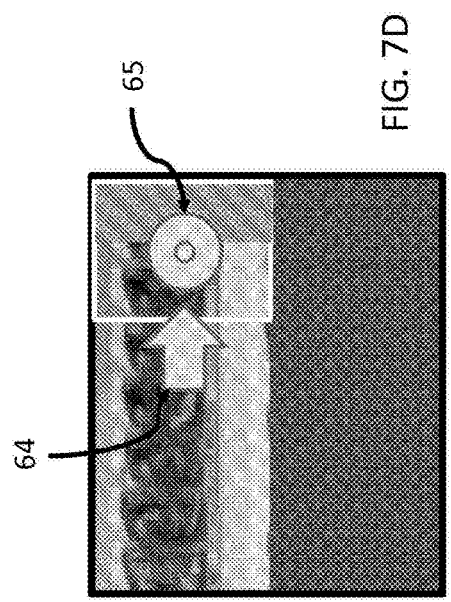

Furthermore, as shown in FIG. 7D, the present disclosure may also comprise displaying in real time a scanning direction indicator 64 and a target indicator 65 indicative of the predetermined scanning direction so as to improve user comfort. Advantageously, the scanning direction indicator 64 (arrow) and the target indicator 65 (circle) may be displayed as an over layer (superimposed) in the preview window in which the floating panoramic image is to be displayed. The scanning direction indicator 64 and the target indicator 65 may be updated so as to progressively follow the filling of the preview window by the floating panoramic images. For example, when the preview window is divided into cells, when the floating panoramic image reaches an extremity of a cell, the target indicator 65 may be swept to the following cell. The target indicator 65 may be semi transparent. The scanning direction indicator 64 may follow the target indicator 65. Following to a shifting of one cell size, the scanning direction indicator may shift back at the start of the last cell of the row of cells currently modified.

Figure 7E:
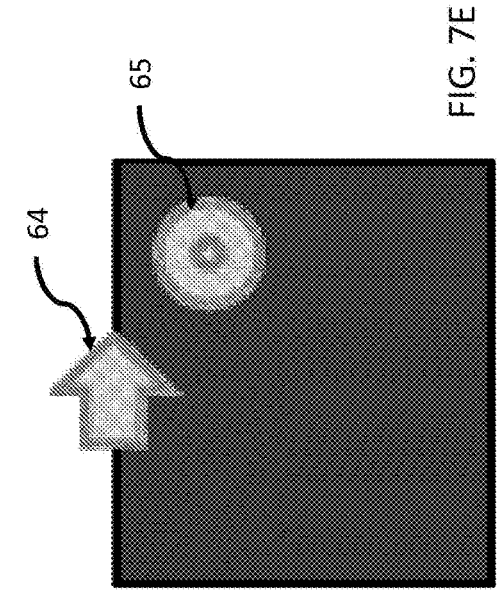
Figure 7C:
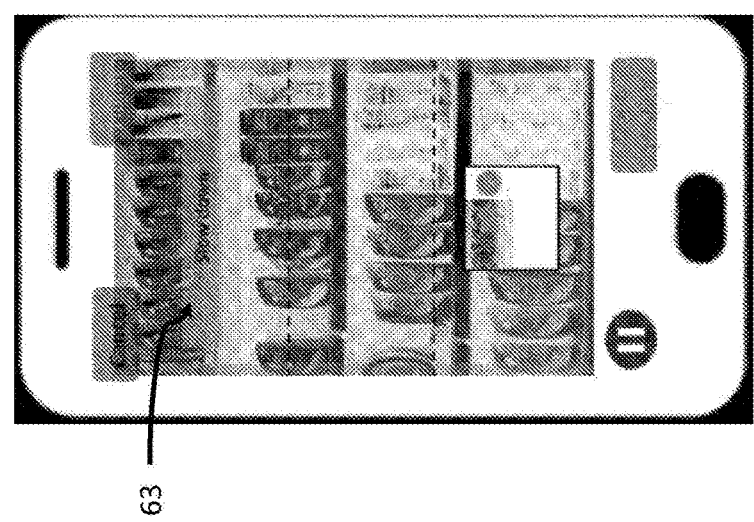

Additionally, the present disclosure may also comprise displaying in real time a drift indicator indicative of a vertical drift of the electronic device during the scanning. The term vertical refers herein to a direction perpendicular to the scanning direction and parallel to the object plane. The vertical drift may be derived from the position sensor of the electronic device and/or using image processing. As shown in FIG. 7E, in some embodiments the drift indicator may be combined with the scanning direction indicator and the drift indication may be provided by modifying a relative position of the scanning direction indicator and target indicator. For example, this can be done by misaligning the center of the target indicator 65 with the head of the arrow 64. In order to assess a drift level, assisting lines may be displayed, wherein a relative position of the drift indicator with respect to the assisting lines indicates the drift level.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A non-transitory computer readable medium including instructions that when executed by a processor cause the processor to perform a method for scanning a retail unit including a plurality of store shelves using an electronic device, the method comprising:
   acquiring from an image sensor in a retail store environment, a plurality of images of at least one product on a store shelf of the retail unit by moving the electronic device along a scanning direction parallel to a horizontal plane associated with the store shelf;
   accessing a memory that stores a plurality of templates associated with a plurality of differing products, wherein each of the plurality of templates is a visual representation of a product;
   identifying in the memory a template with a visual representation of a product that matches the at least one product on the store shelf in the plurality of acquired images;
   comparing dimensions of the at least one product in the plurality of acquired images with dimensions of the visual representation of the product in the identified template;
   based on the dimensions comparison between the at least one product in the plurality of acquired images and the visual representation of the product in the identified template, determining whether a distance between the image sensor and the at least one product on the store shelf is within an acceptable range for additional image processing;
   displaying on a display screen configured to display in real time the plurality of images being acquired a notification to adjust the distance between the image sensor and the at least one product on the shelf when the at least one product is outside of the acceptable range;
   determining a vertical drift of the electronic device during the acquiring of the plurality of images, wherein the vertical drift is a change in an actual scanning direction relative to a predetermined scanning direction and the change is in a direction perpendicular to the predetermined scanning direction; and
   displaying on the display screen a visual indicator indicative of the determined vertical drift.

2. The non-transitory computer readable medium of claim 1, further comprising generating a panoramic image from the plurality of acquired images, and identifying the at least one product within the panoramic image.

3. The non-transitory computer readable medium of claim 1, wherein the notification includes a distance indicator indicative of a distance from the image sensor to a front of the store shelf.

4. The non-transitory computer readable medium of claim 3, wherein the distance indicator is superimposed on and displayed together with an image of the store shelf.

5. The non-transitory computer readable medium of claim 1, wherein the notification includes an image representation of the template displayed together with an image of the store shelf.

6. The non-transitory computer readable medium of claim 5, wherein the image representation is a silhouette of the product.

7. The non-transitory computer readable medium of claim 1, wherein the notification is provided when the at least one product occupies more than about 40% of a field of view of the image sensor or less than about 20% of the field of view of the image sensor.

8. The non-transitory computer readable medium of claim 1, wherein the notification is provided when the at least one product occupies more than about 35% of a field of view of the image sensor or less than about 25% of the field of view of the image sensor.

9. The non-transitory computer readable medium of claim 1, wherein the method further comprises:
   determining changes in the distance between the image sensor and the at least one product on the store shelf based on data from a position sensor included in the electronic device, wherein the position sensor enables calculation of a rotational change of the electronic device from image to image.

10. The non-transitory computer readable medium of claim 1, wherein the method further includes:
   maintaining a plurality of product-specific templates associated with at least one of products and product categories;
   maintaining at least one generic template;
   during accessing, when a product-specific template is not identified in memory for the at least one product in the plurality of images, using the at least one generic template to determine whether the distance is within an acceptable range.

11. The non-transitory computer readable medium of claim 1, wherein providing the notification and acquiring the plurality of images take place substantially simultaneously.

12. The non-transitory computer readable medium of claim 1, wherein determining the vertical drift of the electronic device includes obtaining data from a position sensor of the electronic device.

13. The non-transitory computer readable medium of claim 1, wherein determining the vertical drift of the electronic device includes using image processing on the plurality of acquired images.

14. The non-transitory computer readable medium of claim 1, further comprising displaying on the display screen horizontal lines parallel to shelves in the retail store environment.

15. The non-transitory computer readable medium of claim 1, further comprising displaying on the display screen the visual indicator superimposed on an image of the store shelf.

16. A handheld electronic device, comprising:
an image sensor for acquiring, in a retail store environment establishment, a plurality of images of at least one product on a store shelf by moving the electronic device along a scanning direction parallel to a horizontal plane associated with the store shelf;
a display screen configured to display in real time the plurality of images being acquired;
a processor configured to:
  access a memory that stores a plurality of templates associated with a plurality of differing products, wherein each of the plurality of templates is a visual representation of a product;
  identify in the memory a template that matches the at least one product on the store shelf in the plurality of acquired images;
  compare dimensions of the at least one product in the plurality of acquired images with dimensions of the visual representation of the product in the identified template;
  based on the dimensions comparison between the at least one product in the plurality of acquired images and the visual representation of the product in the identified template, determine whether a distance between the image sensor and the at least one product on the store shelf is within an acceptable range for additional image processing;
  display on the display screen a notification to adjust the distance between the image sensor and the at least one product on the shelf when the at least one product is outside of the acceptable range;
  determine a vertical drift of the electronic device during acquiring of the plurality of images, wherein the vertical drift is a change in an actual scanning direction relative to a predetermined scanning direction and the change is in a direction perpendicular to the predetermined scanning direction; and
  display on the display screen a visual indicator indicative of the determined vertical drift.

17. The handheld electronic device of claim 16, wherein the processor is further configured to generate a panoramic image from the plurality of acquired images, and to identify the at least one product within the panoramic image.

18. The handheld electronic device of claim 16, wherein the notification includes a distance indicator indicative of a distance from the image sensor to a front of the store shelf.

19. The handheld electronic device of claim 18, wherein the distance indicator is superimposed on and displayed together with an image of the store shelf.

20. The handheld electronic device of claim 16, wherein the notification includes an image representation of the template displayed together with an image of the store shelf.

* * * * *

UNITED STATES PATENT AND TRADEMARK OFFICE
CERTIFICATE OF CORRECTION

PATENT NO. : 10,122,915 B2
APPLICATION NO. : 15/187276
DATED : November 6, 2018
INVENTOR(S) : Hilit Maayan, Daniel Shimon Cohen and Jacob Greenshpan Page 1 of 1

It is certified that error appears in the above-identified patent and that said Letters Patent is hereby corrected as shown below:

In the Claims

Claim 16, Column 13, Lines 24-25, "in a retail store environment establishment" should read --in a retail store environment--.

Signed and Sealed this
Eighth Day of January, 2019

Andrei Iancu
*Director of the United States Patent and Trademark Office*